US008886714B2

(12) United States Patent
Brand (10) Patent No.: US 8,886,714 B2
(45) Date of Patent: Nov. 11, 2014

(54) REMOTE ACCESS SERVICE FOR CLOUD-ENABLED NETWORK DEVICES

(75) Inventor: Aron Brand, Petach-Tikva (IL)

(73) Assignee: Ctera Networks Ltd., Petach-Tikva (IL)

( * ) Notice: Subject to any disclaimer, the term of this patent is extended or adjusted under 35 U.S.C. 154(b) by 148 days.

(21) Appl. No.: 13/205,238

(22) Filed: Aug. 8, 2011

(65) Prior Publication Data

US 2013/0041931 A1  Feb. 14, 2013

(51) Int. Cl.
*G06F 15/16* (2006.01)
*G06F 9/06* (2006.01)

(52) U.S. Cl.
CPC ........................................ *G06F 9/06* (2013.01)
USPC ........... 709/203; 709/217; 709/218; 709/219; 709/227; 709/249

(58) Field of Classification Search
USPC ........................ 709/203, 217–219, 227, 249
See application file for complete search history.

(56) References Cited

U.S. PATENT DOCUMENTS

| 2010/0042720 | A1* | 2/2010 | Stienhans et al. | 709/226 |
| 2010/0161759 | A1* | 6/2010 | Brand | 709/218 |
| 2011/0054878 | A1* | 3/2011 | Zhang et al. | 703/21 |
| 2011/0082982 | A1* | 4/2011 | Harvell et al. | 711/122 |
| 2012/0137213 | A1* | 5/2012 | Hayler et al. | 715/239 |

* cited by examiner

*Primary Examiner* — Wing F Chan
*Assistant Examiner* — Padma Mundur
(74) *Attorney, Agent, or Firm* — M&B IP Analysts LLC (57) ABSTRACT

A method for enabling a remote access to a cloud-enabled network device, the method is performed by a cloud relay server that communicates with at least one client over an internet connection. The method comprises receiving a request from a client to access at least a user interface of the cloud-enabled network device through an internet connection, wherein the cloud-enabled network device is connected in a local area network; using a host name designated in the request to detect a cloud connector that communicates with the cloud-enabled network device; sending an open relay message to the cloud-enabled network device through the cloud connector over a management link; and establishing a secure tunnel between the cloud relay server and the cloud-enabled network device, thereby enabling a secure connection between the client and the cloud-enabled network device over the internet connection.

19 Claims, 5 Drawing Sheets

REMOTE ACCESS SERVICE FOR CLOUD-ENABLED NETWORK DEVICES

TECHNICAL FIELD

The invention generally relates to network devices that are integrated with cloud services, and more particularly to techniques for allowing efficient and secure remote access to such devices.

BACKGROUND OF THE INVENTION

The demand for storage has been rapidly increasing as the amount of data such as digital media stored by users grows, so does their need to store digital media reliably over extended periods of time. Traditional backup solutions periodically copy data to, for example, backup tapes, compact discs (CDs), or other local storage media. However, such solutions are not optimal as the backup media is stored in a single location and media used for backup are prone to failure.

Commercially available services referred to as cloud storage services provide mass storage through a web service interface available through the Internet. The storage infrastructure includes a distributed array of geographically distributed data centers connected to a plurality of clients through a wide area network (WAN). A data center typically consists of servers and mass storage facilitating cloud storage services to the clients. Such services enable applications including, for example, backup and restore of data, data synchronization, file sharing, and so on.

Cloud storage services are accessible from anywhere in the world through a client implementing a web services interface designed to at least synchronize data with the data centers. However, such web services fail to provide standard file sharing protocols (e.g., common internet file system (CIFS) or network file system (NFS)). In addition, accessing files stored in the cloud storage from the LAN is typically many times slower than accessing files stored in storage devices on the same LAN.

A network attached storage (NAS) device for performing NAS operations with cloud storage services is also discussed in the related art. Such a NAS device provides the functionality of data storage, file-based operations (e.g., read, write, delete, modify, etc.), and the management of these functionalities to clients on the network. Specifically, a client can store data in its local storage which is also synchronized with a cloud storage service. The client can access and perform file-based operations either on its local storage or the cloud storage service. An access to the files in the device is only through a local area network, while access to the cloud storage is through a web portal. An example for a NAS device that provides cloud storage services can be found in a Co-Pending patent application Ser. No. 12/641,559 entitle "STORAGE DEVICE AND METHOD THEREOF FOR INTEGRATING NETWORK ATTACHED STORAGE WITH CLOUD STORAGE SERVICES," assigned to the common assignee and the contents of which are herein incorporated by reference.

Network devices are commonly accessed using a Web-based interface enabling control of the devices. However, a number of practical factors restrict the possibility to access network devices over the web. A local area network (LAN) in which the devices operate, is often protected by a firewall or a network address translation (NAT) device, which prevents remote users from connecting to the device. Even if firewalls are reconfigured to allow access, the LAN network may be set with Network Address Translation (NAT) to a dynamic public IP address, which makes locating the device difficult. Furthermore, even if access is allowed by firewalls, or made possible by a VPN (Virtual Private Network), the Internet connection of the LAN network, using last mile access technologies such as Asymmetric Digital Subscriber Line (ADSL), is often slow (especially in the upstream direction), congested, and has high latency, resulting in poor responsiveness when accessed remotely.

It would be therefore advantageous to provide a solution for allowing secure remote access to the network devices over the World Wide Web. It would be further advantageous if the proposed solution would accelerate such remote access for optimized application responsiveness.

SUMMARY OF THE INVENTION

Certain embodiments disclosed herein include a method for enabling a remote access to a cloud-enabled network device, the method is performed by a cloud relay server that communicates with at least one client over an internet connection. The method comprises receiving a request from a client to access at least a user interface of the cloud-enabled network device through an internet connection, wherein the cloud-enabled network device is connected in a local area network; using a host name designated in the request to detect a cloud connector that communicates with the cloud-enabled network device; sending an open relay message to the cloud-enabled network device through the cloud connector over a management link; and establishing a secure tunnel between the cloud relay server and the cloud-enabled network device, thereby enabling a secure connection between the client and the cloud-enabled network device over the internet connection.

Certain embodiments disclosed herein also include a method for optimizing communication between a client and a cloud-enabled network device communicating over the internet, wherein the cloud-enabled network device is connected in a local area network and communicates with the cloud replay server over a secure tunnel. The method comprises receiving a request from the client to access a user interface of the cloud-enabled network device; checking if the request is for a static resource of the user interface; sending the static resource from the cloud relay server to the client over the internet; and relaying the request to the cloud-enabled network device over the secure tunnel if the request cannot be served by the cloud relay server.

Certain embodiments disclosed herein also include a cloud storage system that comprises a plurality of cloud connecters connected to a cloud-enable network device through a management link, wherein the cloud-enable network device is connected in a local area network; at least one cloud relay server for at least enabling a client to access the cloud-enable network device through an internet connection by: receiving a request from the client to access at least a user interface of the cloud-enabled network device through the internet connection, using a host name designated in the request to detect one of the plurality of cloud connectors that communicates with the cloud-enabled network device; sending an open relay message to the cloud-enabled network device through the cloud connector over the management link; and establishing a secure tunnel between the cloud relay server and the cloud-enabled network device, thereby enabling a secure connection between the client and the cloud-enabled network device over the internet connection.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
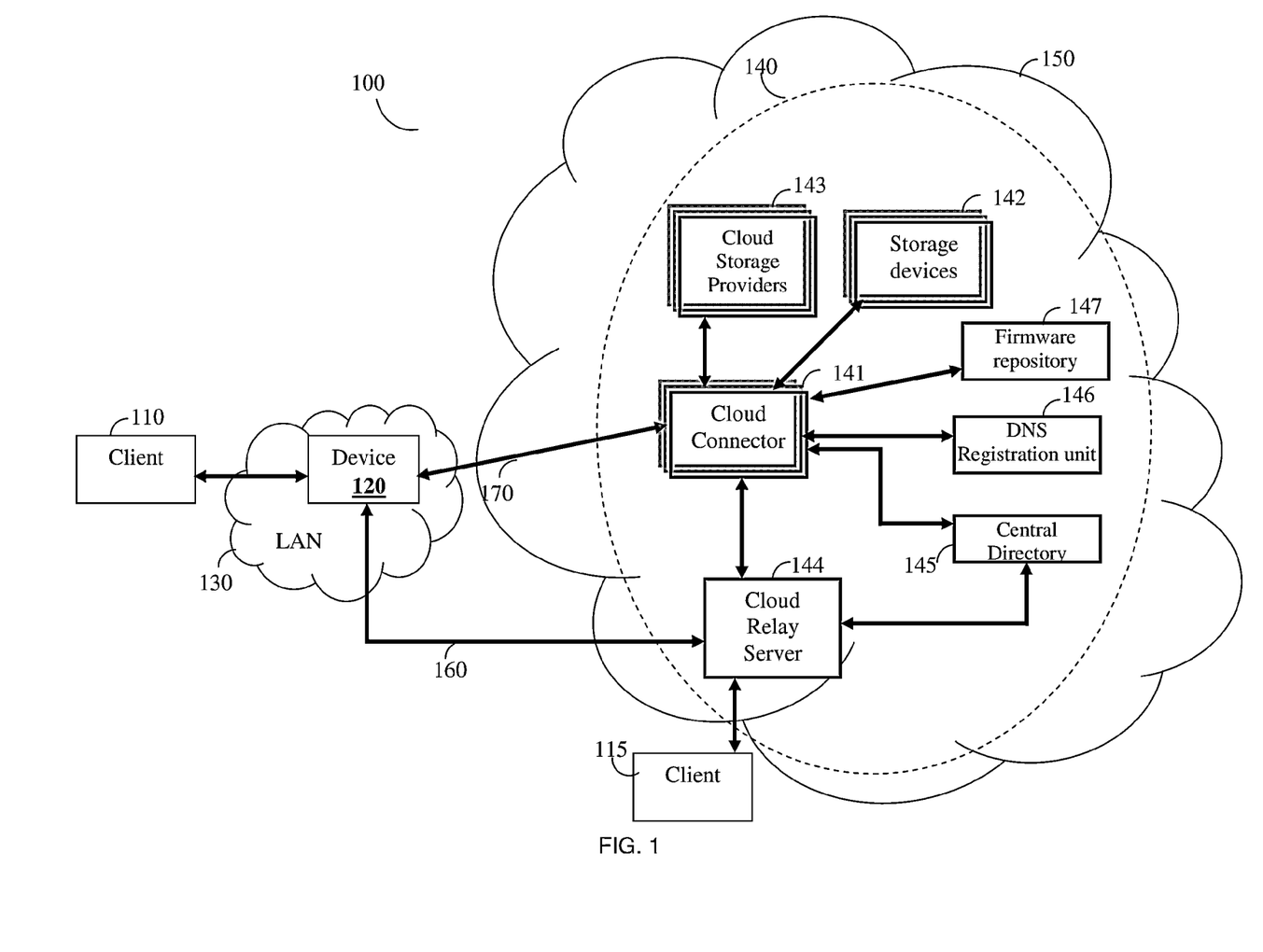
FIG. 1 is a storage network system useful in describing the principles of the invention.

FIG. 1 shows an exemplary and non-limiting diagram of a storage network system 100 utilized to describe the various embodiments of the invention. The system 100 includes a client 110 connected to a device 120 through a local area network (LAN) 130, which may be either a wireless or wired network. In addition, a client 115 can access the device 120 through a network 150 which may be the Internet or a wide area network (WAN).

The device 120 is connected to a cloud storage service (CSS) 140 through the network 150. The CSS 140 consists of a plurality of cloud connectors 141 that facilitate connections between the device 120 and storage devices 142 (e.g., disk drives and/or SAN/NAS devices) as well as connections to public cloud storage providers 143 (e.g., Amazon Web Services, Nirvanix, etc.).

In accordance with an embodiment of the invention, the device 120 is a NAS device that provides cloud storage services. An example of such a device is disclosed in the co-pending patent application Ser. No. 12/641,559, referenced above. The device 120 is connected in the LAN 130, and as such is protected by a firewall that protects the device from remote access attempts through the Internet. Commonly, the firewall acts also as a NAT device, translating private IP addresses of a device in the LAN to one or more public IP addresses, which are possibly dynamic addresses.

Certain embodiments disclosed herein allow the client 115 to remotely access the device 120 through the network 150. With this aim, the CSS 140 also includes at least one cloud relay server 144, a central directory 145, and a DNS registration unit 146 all connected to the cloud connectors 141.

Each of the cloud connectors 141 is assigned with a fixed internet protocol (IP) address. The device 120 establishes a management link 170 with one of the cloud connectors 141 that is selected arbitrarily. The management link 170 is an active connection secured using a communication protocol including, but not limited to, Transport Layer Security (TLS), Secure Sockets Layer (SSL), IPSEC, and the like. The device 120 sends periodical "keep-alive" messages over the management link to ensure that the connection is alive. If the connection is lost, the management link 170 is re-established by the device 120. As an outgoing connection, the management link 170 is permitted to pass through any firewall and/or NAT device connected in the LAN 130. Over the management link 170, the cloud connector 141 and the device 120 can reliably exchange incoming and outgoing messages.

The cloud connectors 141 use the central directory 145 to keep records of which device 120 is currently connected to which connector 141. It should be noted that although a single device 120 is shown in FIG. 1, the system 100 may include a plurality of devices such as the device 120 connected in the LAN 130 or other LANs. Thus, the cloud connectors 141 can manage the connections to multiple devices 120.

The cloud relay server 144 has a secure and trusted communications channel to the cloud connectors 141 and central directory 145. When a device is added to the system 100, a unique domain name system (DNS) record is created. Specifically, the domain name of the device (e.g., devicename.myservice.com) is mapped to an IP address of the cloud relay server 144. In an exemplary embodiment of the invention, the mapping is performed by insertion of an address record "A" Type record as described, for example, by IETF RFC 1035, DOMAIN NAMES—IMPLEMENTATION AND SPECIFICATION, P. Mockapetris, Section 3.2.2. Such mapping is performed by the DNS registration unit 146 under the control of a cloud connector 141. For Load balancing between multiple cloud relay servers, techniques such as, but not limited to, round robin DNS can be employed. It should be noted that in certain embodiments of the invention, the cloud relay server 144 and cloud connector 141 may be implemented as a single server combining both functions.

According to the teachings of certain embodiments of the invention, the client 115 can remotely access the device 120 using the HTTP protocol, over the network 150 through the cloud relay server 144. Specifically, a secure tunnel 160 is established from the device 120 to the cloud relay server 144, under the control of the cloud connector 141. Over the secure tunnel 160, the client 115 can access the device 120, for example, using an HTTP or HTTPS protocol. In an embodiment of the invention, the device 120 provides to the client an access to a user interface, through which the client 115 (and also client 110) can manage and access resources of the device 120. For example, the client 115 can perform file-based operations on files stored in the device 120, upload/download files, or can configure various setting of the device 120 using the user interface. Exemplary screenshots of the user interface are provided in FIGS. 2A and 2B.

Figure 2A:
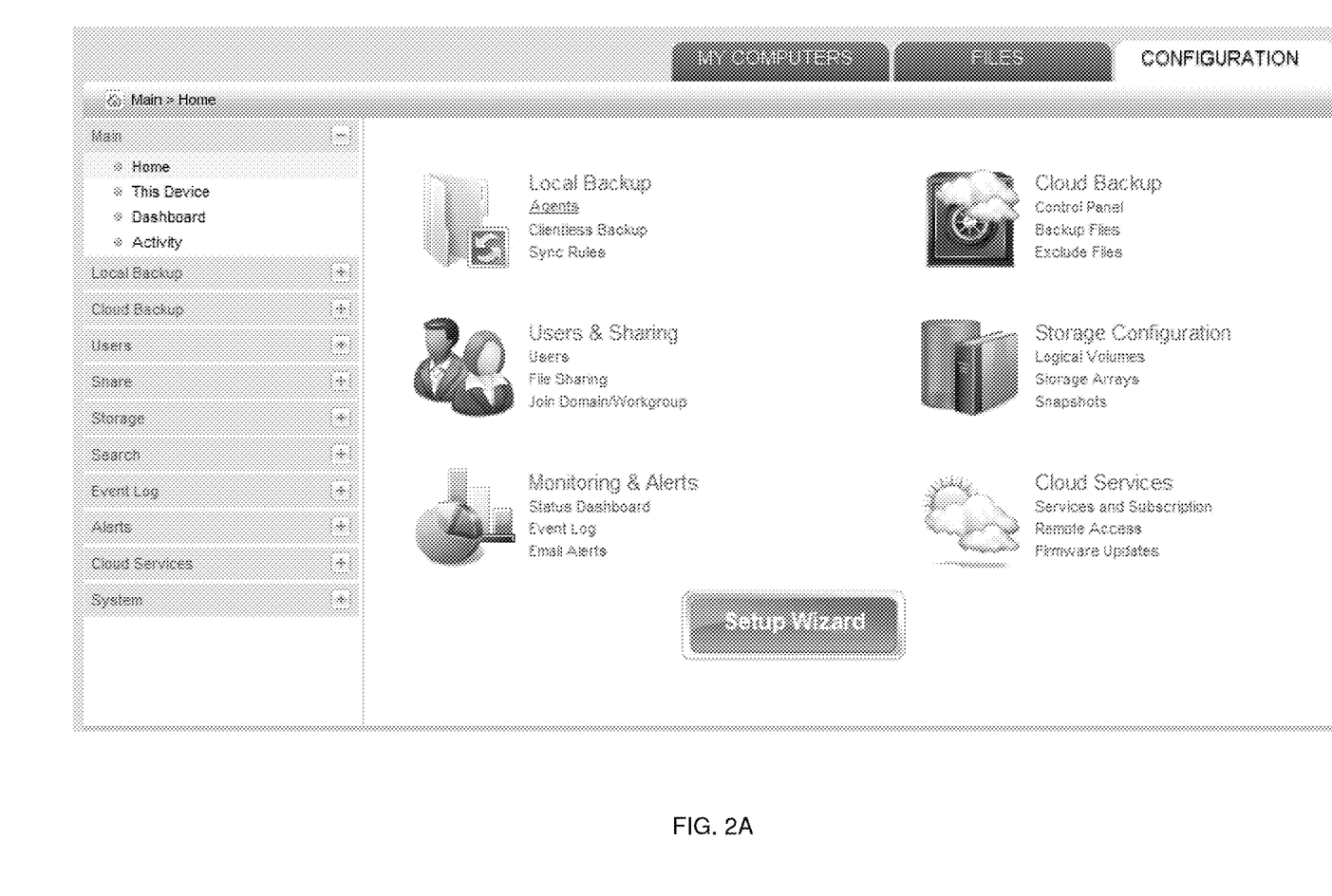
FIGS. 2A and 2B are exemplary screenshots of a user interface of a device.
Figure 2B:
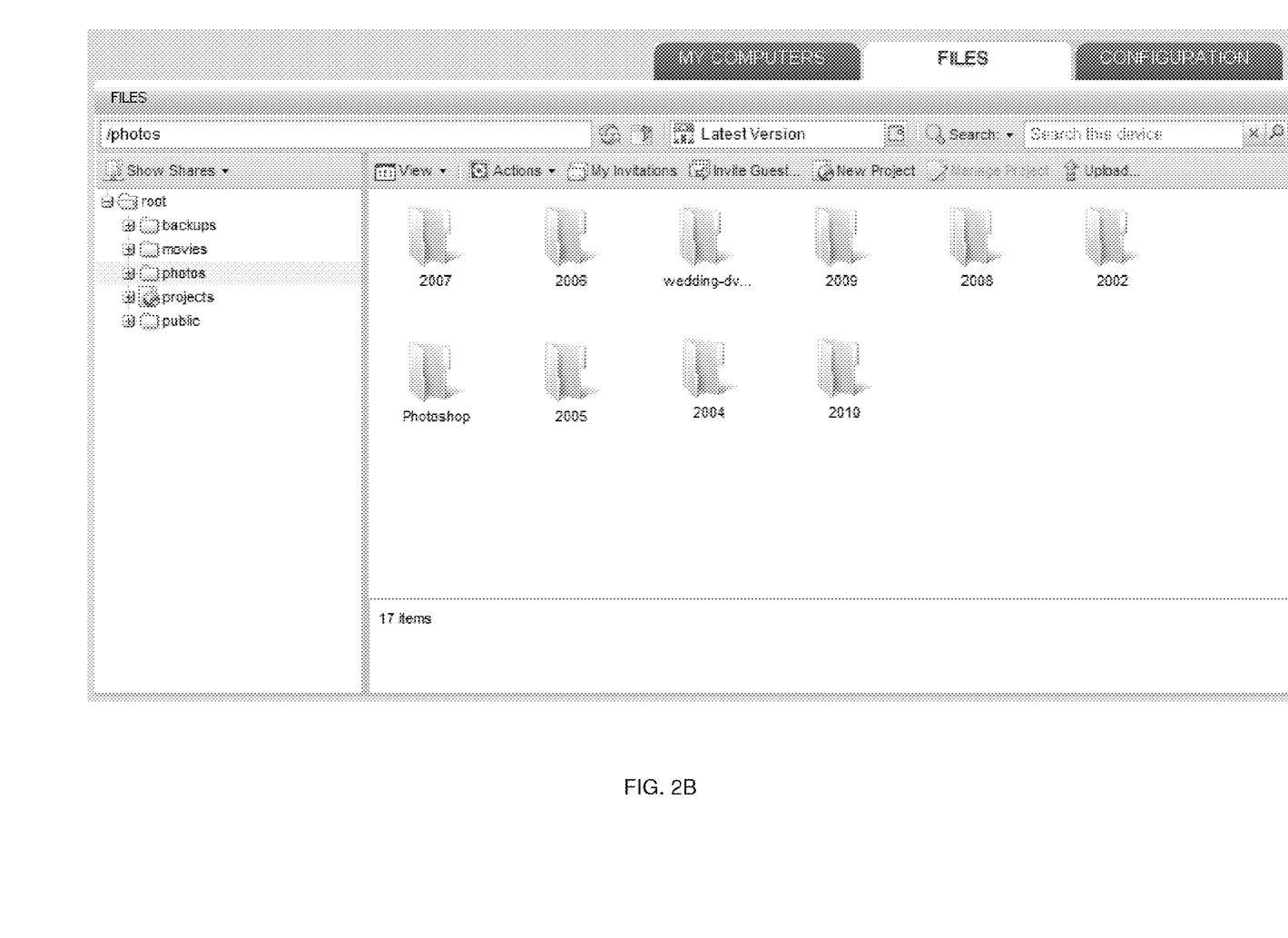

FIG. 2A depicts an exemplary configuration tab of the device 120 in which a user of client 115 can set the files to be backed up, schedule cloud synchronizations, define user accounts, view reports, set alarms, and so on. FIG. 2B is a list of folders including files stored in the device 120 as well as files synchronized with the CSS 140. The user of the client 115 can remotely perform file-based operations on files stored in the device 120, download files, and upload files to the device.

Figure 3:
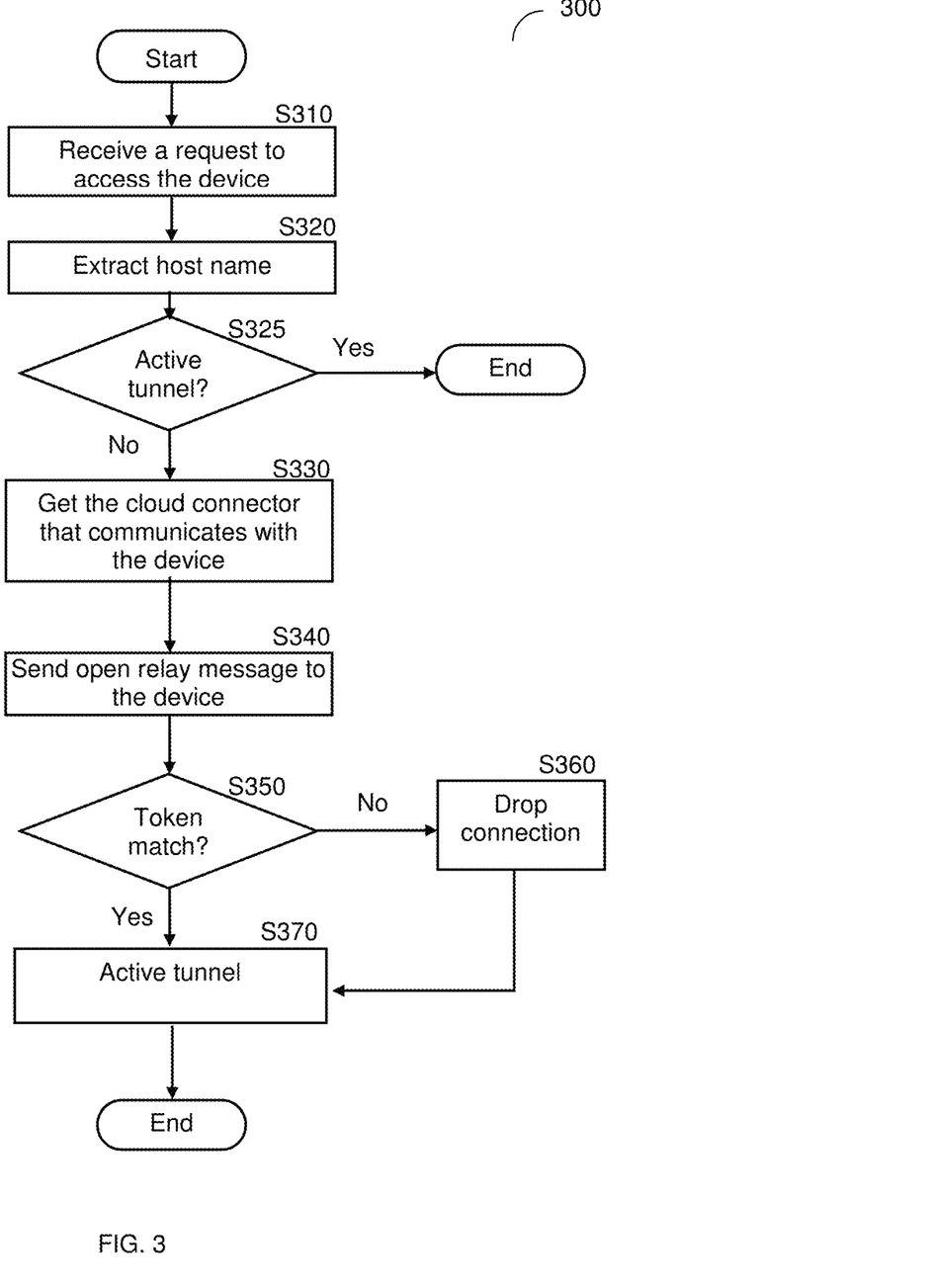
FIG. 3 is a flowchart describing a method for enabling a remote access to the device in accordance with an embodiment of the invention.

FIG. 3 shows an exemplary and non-limiting flowchart 300 describing a method for enabling a remote access to a NAS device that provides cloud services according to an embodiment of the invention. In a non-limiting embodiment and without departing from the scope of the invention, the method will be described with a reference to the system 100 depicted in FIG. 1.

At S310, a request to access the device 120 over the network 150 is received at the cloud relay server 144. The request may be, for example, a hypertext transfer protocol (HTTP) or HTTPS request. At S320, a host name (designating the device 120) is extracted from the request, e.g., from the Host header of the HTTP request. At S325, it is checked if there is an existing authenticated tunnel from the cloud relay server 144 to the device 120, and if so execution ends; otherwise, continuing with S330, where the central repository 145 is inquired to retrieve the cloud connector 141 that currently serves the device 120.

At S340, an open relay message is sent to the device 120 from the cloud relay server 144 to a cloud connector 141 over the management link 170. The open relay message includes the ID of the target device 120, the IP address of the relay server 144, a secret token, and the IP address of the client 115. In an exemplary embodiment, the secret token includes a large random number.

The device 120, upon reception of the open relay message, opens a connection, the secure tunnel 160, with the relay server 144. In an embodiment of the invention, the secure tunnel 160 is an IP connection secured using the protocols SSL, TLS, IPSEC, and the like. The device validates the cloud relay server's Security Certificate. If the certificate is valid, the secret token is sent to the relay server 144 over the tunnel 160.

At S350, the server 144 compares the received secret token with its generated token (included in the open relay message), and if the tokens match the device 120 is considered authenticated and the secure tunnel 160 is set to be active; otherwise, the connection is dropped, at S360, and execution ends.

At S370, once the secure tunnel is active all requests from the client 115 received from the Internet network 150 are relayed to the device over the tunnel, and the corresponding responses are relayed back to the client 115. In one embodiment, the secure tunnel becomes inactive when no communication occurs during a predefined time interval.

According to an embodiment of the invention, clients that seek to remotely access the device 120 and are located in the same network segment as the device 120 can automatically bypass the relay server 144 to communicate with the device directly. This approach will reduce the latency and network traffic to improve responsiveness of the user interface of the device.

According to this embodiment, the device 120 reports its internal network interfaces list, defined by pairs of an IP address and a network mask, to a cloud connector 141 over the management link 170. The device 120 also reports its private IP address in the LAN. In addition, the cloud connector 141 stores the device 120's public IP address, which is the source IP address of the management link 170.

When the cloud connector 141 receives an open relay message (defined above), it is assumed that the client (e.g., client 115) can connect to the device 120 directly, without requiring a cloud relay server, if at least one of the following conditions is satisfied: 1) the client's (e.g., client 115) source IP address equals to the device public IP address, this is a good indication that the client and the device are behind the same NAT device; and 2) the client's (e.g., client 115) source IP address is within the IP network defined by the device 120 reported network interfaces list.

If at least one of the above conditions is true, the cloud relay server 144 returns to the client a permanent redirect response, for example, HTTP 301 Moved Permanently response, replacing the target hostname with the device's private IP address. Following this redirect response, the client 115 using, for example, its web browser proceeds by communicating directly with the device 120 over the LAN 130 bypassing the cloud relay server 144 entirely.

Figure 4:
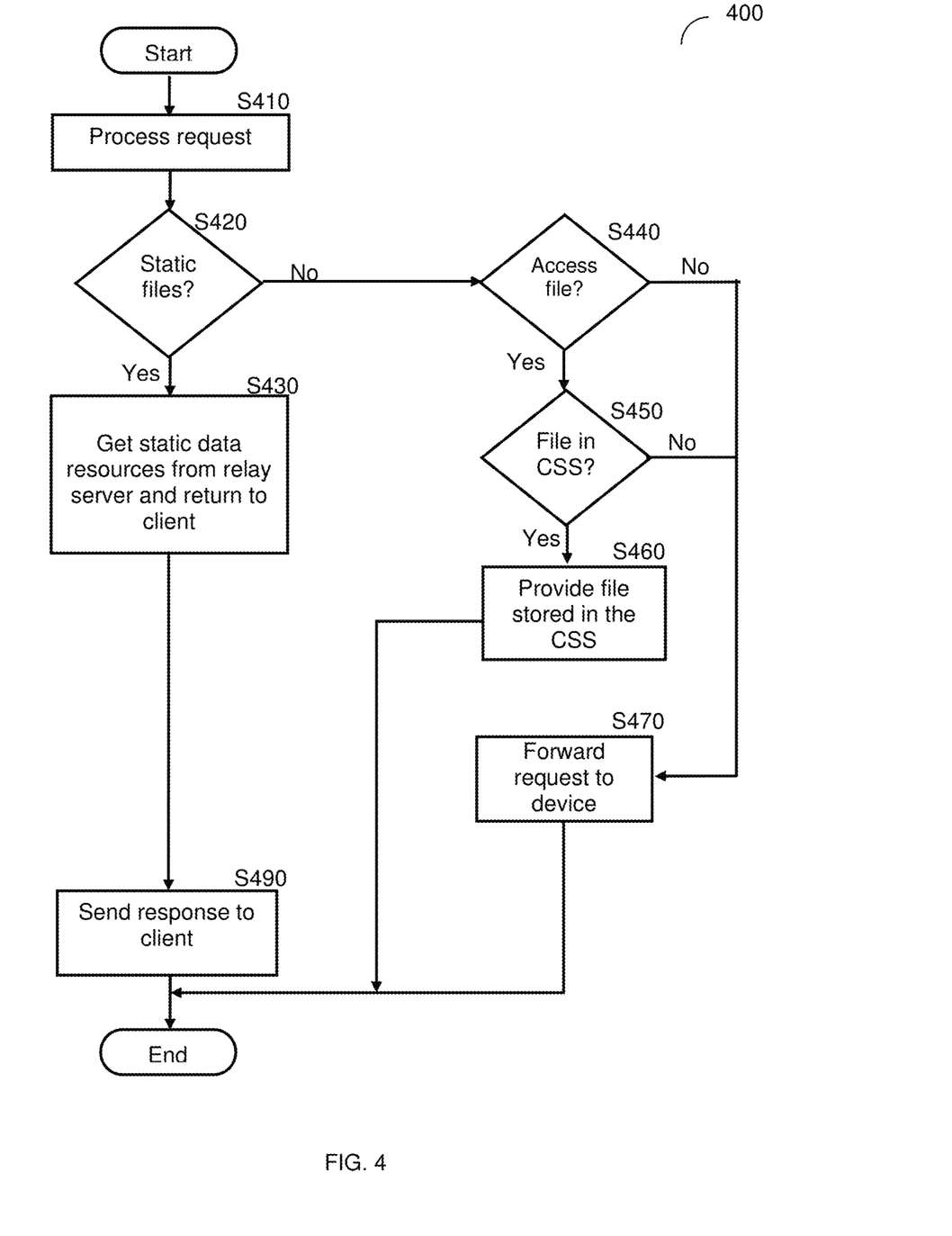
FIG. 4 is a flowchart describing a method for optimizing communication between a web client and the device in accordance with an embodiment of the invention.

FIG. 4 shows an exemplary and non-limiting flowchart 400 illustrating a method for optimizing the communication between a client and cloud-enabled device according to an embodiment of the invention. In a non-limiting embodiment and without departing from the scope of the invention, the method will be described with a reference to the system 100 depicted in FIG. 1.

As discussed above, the client 115 accesses the device 120 over the Internet through the cloud relay server 144. The client 115 interacts with a user interface of the device 120 in order to change the setting of the device and/or perform file-based operations on files stored in the device.

In an embodiment of the invention, the user interface is a web application that can be accessed using a web browser. The web application may be embedded in a firmware (or software) that resides in a persistent storage (not shown) of the device 120. The firmware includes, among other things, static files used by the web application, such as HTML and graphics files. For example, the screenshot depicted in FIG. 2A contains a collection of icons, which are static files.

In an embodiment of the invention, the CSS 140 includes a firmware updates service. An updated image of the firmware for each device is maintained by the cloud connectors 141 in a firmware repository 147. The cloud connectors 141 update the device 120 with a new image of the firmware. The cloud relay server 144 can access the firmware repository to retrieve an image of the firmware. Thus, according to an embodiment of the invention, the cloud relay server 144 caches an image of the most updated firmware of each device with which it has an active tunnel 160.

At S410, upon receiving a request, e.g., HTTP GET request from the client 115 for a web resource, the cloud relay server 144 processes the request to determine if it can be satisfied by the cloud relay server 144.

At S420, a requested uniform resource identifier (URI) in the request is checked against a list of static files. If the URI is found in the static files list, execution continues with S430 where the static file is retrieved from the cached image of the firmware and returned to the client at S490. Thus, for static resources, no data is sent or received from the device 120 over the secure tunnel 160. It should be noted that as the link to the datacenter of CSS 140 is much faster than the Internet connection of the LAN, the application responsiveness is significantly improved.

If S420 results with a NO answer, i.e., the requested URI is not found in the static files list, execution proceeds to S440, where another check is made to determine if the request is to access a file saved locally in the device 120. If S440 results with a YES answer, at S450 it is checked if the requested file is saved in the CSS 140. The check is performed by inquiring the cloud connector 141 that maintains the updated status of files managed by the device 120. If the requested file is in the CSS 144, then at S460, the client 115 is provided with the file stored in the CSS 144, thus no data is sent or received from the device 120 over the secure tunnel 160. It should be noted that as the link to the datacenter of CSS 140 is much faster than the Internet connection to the LAN, the latency in accessing the file is significantly reduced.

If S440 and S450 result with a NO answer, execution proceeds to S470 where the received request is relayed to the device 120 over the active tunnel 160, which returns the resource to the client in step S490.

The invention has been described with reference to a specific embodiment where the device 120 is a NAS device that enables cloud storage services. However, the teachings disclosed herein can be adapted to support secure, efficient remote access through the Internet to any cloud-enabled device having a user interface, that is, a device having a permanent link to a cloud based service.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the embodiments of the invention disclosed herein can be implemented as any combination of hardware, firmware, and software. Moreover, the software is preferably implemented as an application program tangibly embodied on a program storage unit or computer readable medium. One of ordinary skill in the art would recognize that a "computer readable medium" is any non-transitory readable medium, except for a transitory propagating signal, for storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for enabling a remote access to a cloud-enabled network device, the method is performed by a cloud relay server that communicates with at least one client over an internet connection, comprising:
   receiving a request from a client at the cloud relay server to access at least a user interface of the cloud-enabled network device through an internet connection, wherein the cloud-enabled network device is connected in a local area network (LAN) external to a cloud storage system and any cloud system;
   using a host name designated in the client request to enable the cloud relay server to identify a cloud connector that communicates with the cloud-enabled network device external to the cloud storage system, wherein the host name identifies the cloud-enabled network device;
   sending an open relay message including a first secret token to the cloud-enabled network device through the identified cloud connector over a management link, wherein the management link is established between the identified cloud connector and the cloud-enabled network device to bypass at least a firewall connected in the LAN; and
   establishing a secure tunnel between the cloud relay server and the cloud-enabled network device, when a response to the received open relay message includes a second secret token matching the first secret token, thereby enabling a secure connection between the client and the cloud-enabled network device over the internet connection.

2. The method of claim 1, further comprising:
   extracting a host name designated in the request; and
   inquiring of a central repository using the host name to detect the cloud connector serving the cloud-enabled network device.

3. The method of claim 1, wherein the open relay message includes an identification (ID) of the device, an internet protocol (IP) address of the cloud relay server, a secret token generated by cloud relay server, and an IP address of the client.

4. The method of claim 1, wherein the management link is a secure communication link and the secure tunnel is an IP connection secured using any one of a transport layer security (TLS) protocol, secure sockets layer (SSL) protocol, and an IPSEC protocol.

5. The method of claim 1, wherein the cloud-enabled network device is at least a network attached storage (NAS) device that provides local storage and cloud storage services.

6. The method of claim 5, wherein the user interface allows to the client to access files locally stored by the network attached storage device and to manage setting of the device.

7. The method of claim 6, wherein the user interface is at least a web application.

8. The method of claim 7, further comprising: optimizing the responsiveness of the web application by serving the client's request by the cloud relay server.

9. The method of claim 8, wherein optimizing the responsiveness of the web application further comprising:
   checking if the request is for a static resource of the web application;
   returning the static resource from a cloud updates repository storing a copy of the web application;
   checking if the request is for a file locally stored in the NAS device; and
   returning the file from a cloud storage system (CSS) storing a copy of the requested file.

10. The method of claim 9, wherein the cloud relay server and the cloud connector are connected in the cloud storage system.

11. The method of claim 1, further comprising: updating the user interface of the cloud-enabled network device by the cloud connector.

12. A non-transitory computer readable medium having stored thereon computer executable code for performing the method of claim 1.

13. A cloud storage system, comprising:
   a plurality of cloud connecters in a cloud storage system connected to a cloud-enabled network device external to the cloud storage system through a management link, wherein the cloud-enabled network device is connected in a local area network (LAN) external to the cloud storage system and any cloud system;
   at least one cloud relay server inside of the cloud storage system for at least enabling a client to access the cloud-enabled network device through an internet connection, wherein the at least one cloud relay server is configured to:
   receive a request from the client to access at least a user interface of the cloud-enabled network device through the internet connection, using a host name designated in the request to identify one of the plurality of cloud connectors that communicates with the cloud-enabled network device, wherein the host name identifies the cloud-enabled network device;
   send an open relay message including a first secret token to the cloud-enabled network device through the identified cloud connector over the management link, wherein the management link is established between the identified cloud connector and the cloud-enabled network device to bypass at least a firewall connected in the LAN; and
   establish a secure tunnel between the cloud relay server inside of the cloud storage system and the cloud-enabled network device external to the cloud storage system, thereby enabling a secure connection between the client and the cloud-enabled network device over the internet connection, wherein the secure tunnel is established when a response to the open relay message includes a second secret token matching the first secret token.

14. The cloud storage system of claim 13, further comprising:
a DNS registration unit for mapping a host name of the cloud-enabled network device to an IP address of the cloud relay server;
a central repository for maintaining records of which of the plurality of cloud connectors serving the cloud-enabled network device; and
a repository for maintaining an updated copy of the user interface.

15. The cloud storage system of claim 13, wherein the cloud-enabled network device is at least a network attached storage (NAS) device that provides local storage and cloud storage services.

16. The cloud storage system of claim 15, further comprising: a plurality of public cloud storage providers and storage devices including data locally stored in the NAS device.

17. The cloud storage system of claim 16, wherein the cloud relay server is further configured to optimize the responsiveness of the user interface by serving the client's request by the cloud relay server.

18. The cloud storage system of claim 17, wherein the cloud relay server is further configured to:
check if the request is for a static resource of the user interface;
return the static resource from a cloud updates repository storing a copy of the user interface;
check if the request is for a file stored in the NAS device; and
return the file from one of the plurality of public cloud storage providers and storage devices.

19. The cloud storage system of claim 13, wherein the user interface is at least a web application.

* * * * *